United States Patent [19]

Brcar

[11] 3,996,750
[45] Dec. 14, 1976

[54] FLAT THROTTLING GATE
[75] Inventor: Anton Brcar, Ljubljana, Yugoslavia
[73] Assignee: Titovi Zavodi Litostroj Ljubljana n.sol.o., Ljubljana, Yugoslavia
[22] Filed: Nov. 13, 1975
[21] Appl. No.: 631,617
[30] Foreign Application Priority Data
Nov. 14, 1974 Yugoslavia .......................... 3040/74
[52] U.S. Cl. .................................. 61/28; 61/22 R; 251/326; 251/63
[51] Int. Cl.² .......................................... E02B 7/30
[58] Field of Search ................ 61/28, 22, 22 A, 23, 61/29, 24; 251/61, 63, 300, 326, 328, 329

[56] References Cited
UNITED STATES PATENTS

| | | | |
|---|---|---|---|
| 1,065,494 | 6/1913 | Andersen | 61/28 UX |
| 2,109,042 | 2/1938 | Bennett et al. | 251/326 X |
| 2,338,724 | 1/1944 | Kalix | 61/28 |
| 2,593,969 | 4/1952 | Bowtell | 61/28 |
| 3,319,425 | 5/1967 | Andrae | 61/28 |
| 3,330,530 | 7/1967 | Andrae | 251/326 X |

FOREIGN PATENTS OR APPLICATIONS 79,244  10/1951  Norway .............................. 61/22 R Primary Examiner—Dennis L. Taylor
Attorney, Agent, or Firm—Karl F. Ross; Herbert Dubno

[57] ABSTRACT

A flat throttling gate for bulb-type turbines and the like which is installed in a draft tube of the turbine. The gate has a central cutout of arcuate configuration flanked by a pair of ramps which cam a pair of masks into respective chambers flanking the guide slot for the slide body. Actuating mechanisms, e.g. springs, bias the masks against the valve body. In the withdrawn position of the valve body, the throttling cutout boundary, the masks and the wall of the draft tube define a circular flow cross section. In the inserted position of the valve body, a narrow flow cross section is provided between the wall of the draft tube or a lining thereof and a boundary of the cutout.

5 Claims, 5 Drawing Figures

FLAT THROTTLING GATE

FIELD OF THE INVENTION

The invention relates to a flat throttling gate for throttling the flow of water in draft tubes of water turbines, especially bulb turbines, where during the idle running of bulb units it is necessary to dissipate kinetic energy of water, continuously or discontinously, at the water to the installed head of hydroelectric plant.

BACKGROUND OF THE INVENTION

Several throttle gates for the dissipation of water energy or for throttling the flow of water conduits, dam-discharge openings or tubine units are known, which are of the ring, conical or similar type also known to provide flat throttling gates for this purpose as well. It has been found, however, that none of the these known types of throttling gates is suitable to be built into the draft tube of a bulb turbine. The reason therefor is to be found in their constructive characteristics and operational properties, so that at the tailwater side of the runner of the hydroelectric, where the kinetic energy of water is to be recovered, only a flat gate comes into consideration. Unfortunately, a simple flat throttling gate in the draft tubes has certain disadvantages. It is known from experimentally obtained data that the guide slots necessary for the guidance of the gate body cause additional energy losses by vortices which by some percents reduce the efficiency of the turbine, having the draft tube with the incorporated gate. The losses are especially intensive for high specific speed water turbines and at high discharges. Roughly estimated, the losses depend on the square of the absolute velocity of water.

In practice, there have been some attempts at eliminating the influence of the slots in the draft tubes, by the use of masks have been applied, connected either to the upper or to the lower part of the gate body and which block the slots when the gate is lifted. The disadvantage of these devices is the need for side openings, which are liable to be filled with sediment (sand and impurities). The use of the application of masks which are not connected to the body itself and are only inserted into the slots eliminates the operational readiness of the gate when a replacement of the mask by the body of the throttling gate is needed.

None of the cited solutions makes possible a secure operation of the gate as releasing device, because the operation of the gate body must be dynamic, i.e. its position should be adaptable to the water discharge desired rate of throttling.

OBJECT OF THE INVENTION

The object of this invention is to eliminate the disadvantages of known flat and other throttling gates to provide a flat throttling gate capable of being built into bulb turbine units, which will have the necessary throttling characteristics in the fully or partially lowered position and minimum discharge losses in the fully lifted position.

SUMMARY OF THE INVENTION

The object according to the invention is achieved in that the body of the gate is provided with symmetrical inclinations on its lower part and at its flanks and the mean lower portion has an cut-out, whose shape corresponds to the inner form of the draft tube section at the place of installation of the gate, while in side chambers there are situated swings turnable around horizontal axes and movable by means of spring or some other actuating mechanism and equipped with a mask, whose shape corresponds to the radius of the draft tube at the place of installation, and with a control roll placed at the free end of the swing.

The advantages of the flat gate according to the invention reside in that when the gate is totally lifted, the movable masks under the influence of the actuating mechanism fill the side guiding slots in the draft tube to the greatest extent, whereas in the case when the body is in a lowered position they are concealed received in their side chambers. Thus the losses owing to the guide slots are reduced to the minimum and, moreover, the structural features themselves enable the installation of the gate near the runner, i.e. at a place where the diameter of the draft tube is smaller, thereby resulting in lower costs for manufacturing the gate.

BRIEF DESCRIPTION OF THE DRAWING

An assembly of the invention will now be described in more detail with reference to the accompanying drawing which shows.

SPECIFIC DESCRIPTION

Figure 1A:
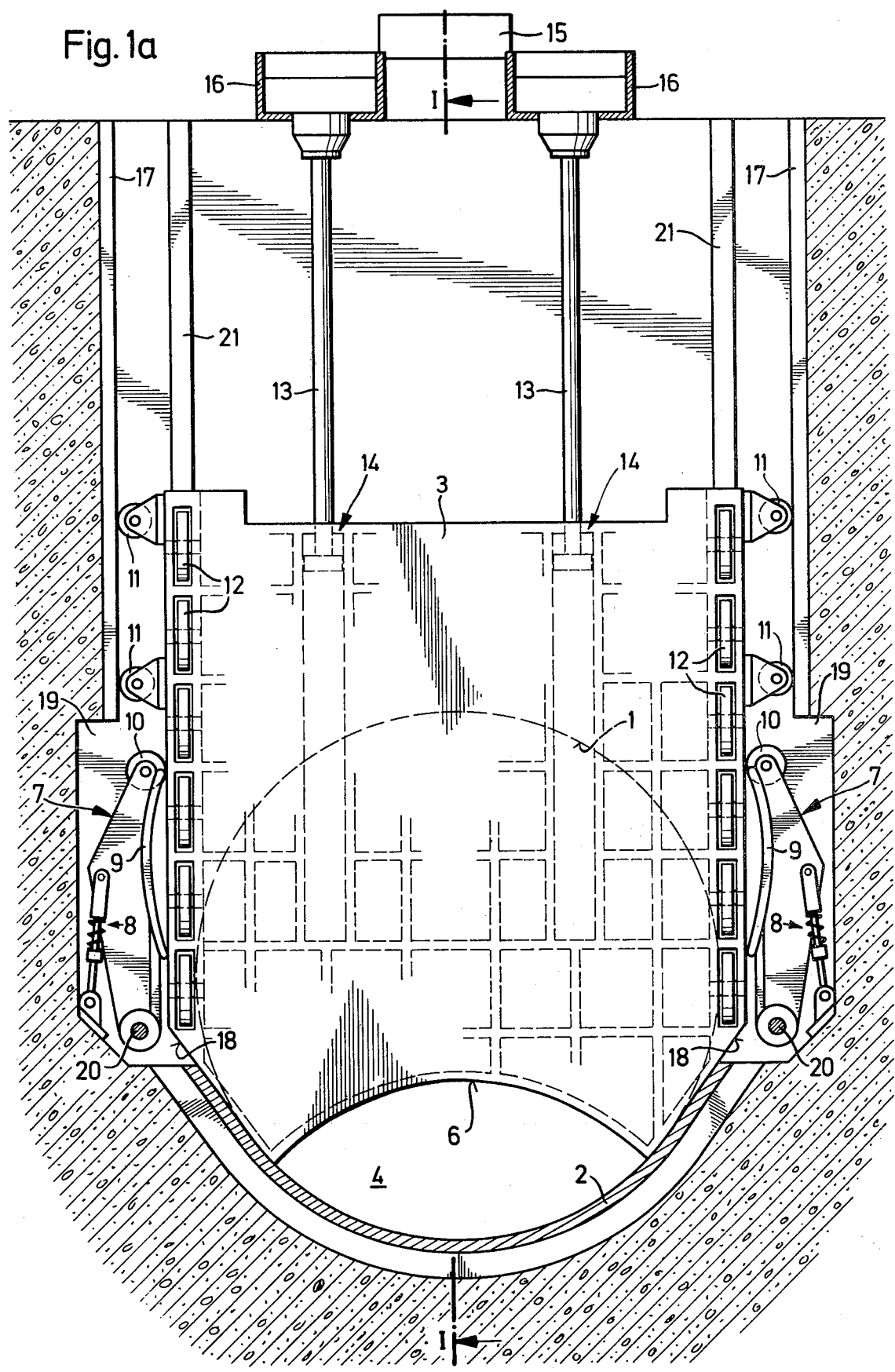
FIGS. 1a and 1b the flat throttling gate is represented in a plan view and built-in, FIG. 1a showing the gate in the lowered position, and FIG. 1b showing the gate in the lifted position, FIG. 2 a cross-section along the line I—I of FIG. 1a, FIG. 3 a detail of the throttling edge of FIG. 2, and FIG. 4 a detail of the throttling edge according to a second embodiment.
Figure 1B:
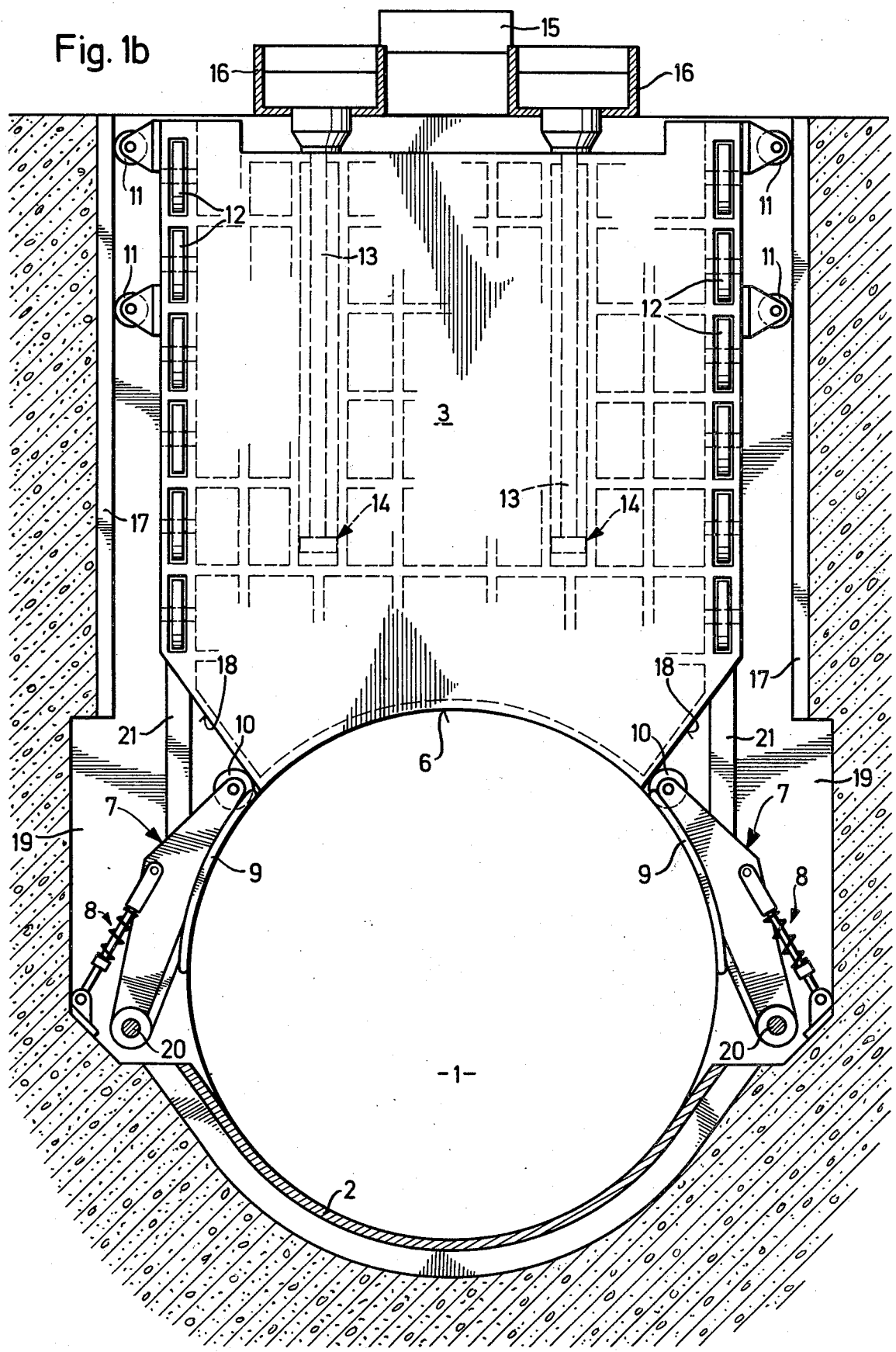
Figure 2:
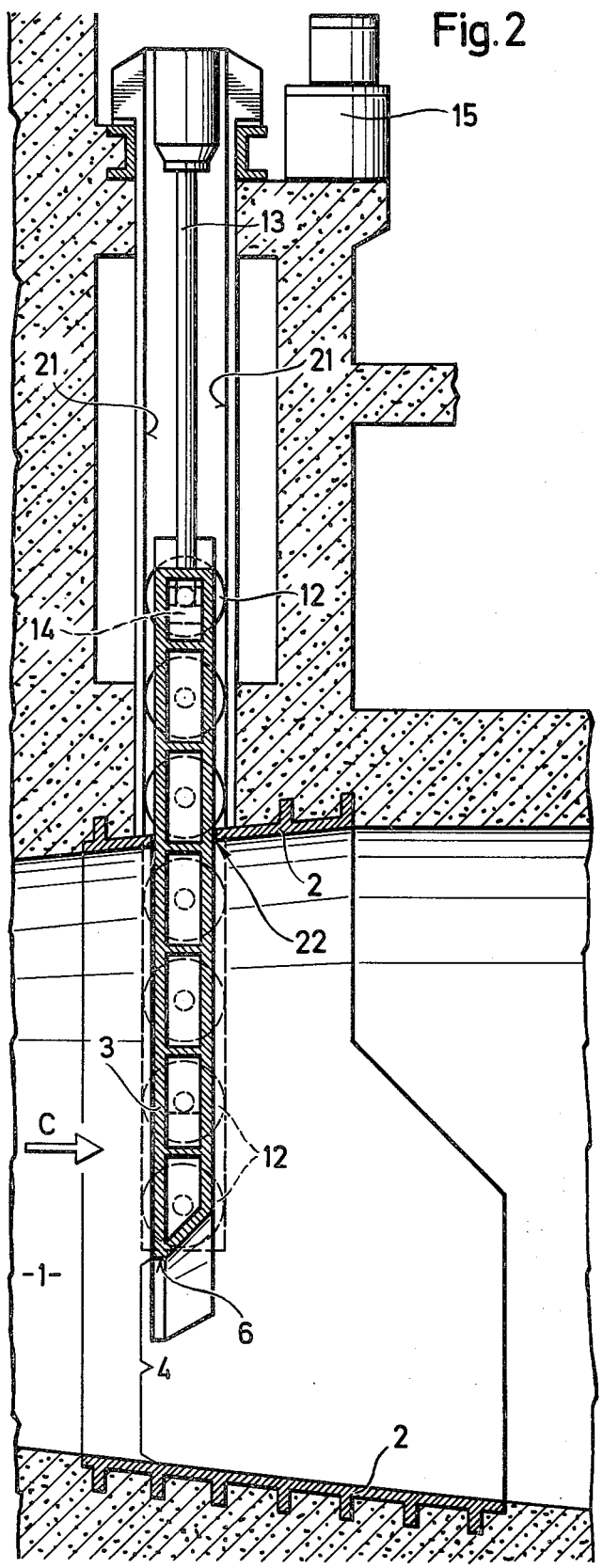

As can be seen in FIGS. 1a and 1b, the gate comprises the flat gate body 3 which at its lower end and at the flanks is provided with symmetrical inclinations 18, whereas the central part thereof is provided with a cut-out 4 and a throttling edge 6. For guidance and supporting of the gate in vertical slots 17 and 21, there are used guiding and supporting rolls 11 and 12, whereas for lifting and lowering of the gate there serve one or more servomotors 14 which by means of piston rods 13 are connected with a beam 16 and by a system of tubes, which are not shown in the drawings, to a hydraulic pressure unit 15 (FIG. 2). At the side of the draft tube 1 which is provided with a lining 2 there are arranged chambers 19 where swings levers 7 are placed, which with one end are pivotally connected to the horizontal axes 20, whereas each free end is rotatably movable and equipped with the control cam follower 10 which under the pressure of the spring or some other actuating or biasing mechanism 8 rolls along the side wall of the gate or its ramp formation 18. The swing 7 is provided with the mask 9. The throttling edge 6 of the body 3 of the gate as well as both masks 9 are formed like segments of a circle, whose diameter is the same as the diameter of the draft tube 1 and the lining 2 at the place of the installation.

When the gate, which is movable through the slot 22 (FIG. 2) in the lining 2 of the draft tube 1, is lowered, an oval (throttling) discharge opening appears between the throttling edge 6 and lining 2 of the draft tube 1. Both swings 7 with masks 9 are then recessed into the side chambers 19. When the gate is lifted, the swings 7 with masks 9 swing by means of actuating mechanisms 8 and control rolls 10 around the axes 20 against the draft tube 1 and fill the opening which remains in the guide slot 22 after the lifting of the gate. In this way, draft tube 1 is fully opened. The stream of water is indicated by arrow C in FIG. 2.

Figure 3:
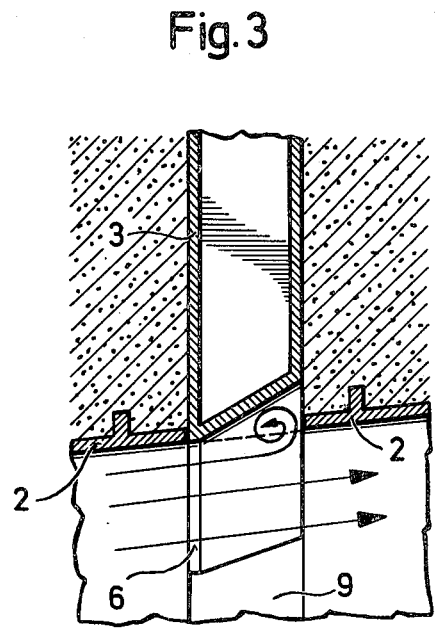
Figure 4:
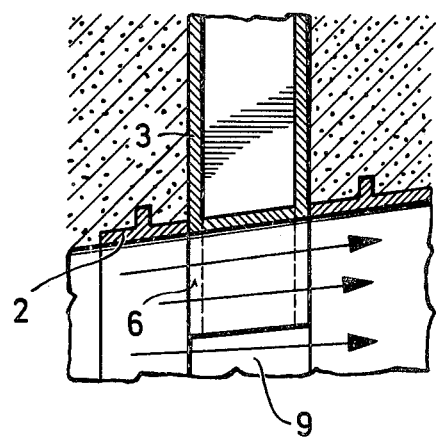

FIGS. 3 and 4 show two possible embodiments of the throttling edge: the first one is advantageous regarding resistance against vibrations and cavitation phenomena, the second one best adapts to the form of the draft tube.

What we claim is:

1. A throttling gate for throttling the flow of water in the draft tube of a water turbine, comprising:
    a flat valve body displaceable transversely to the draft tube toward and away from a wall thereof, said draft tube being formed with a guide slot for said body;
    guiding and supporting rolls movably mounting said body for displacement thereof transversely to the axis of said tube in said slot;
    means defining a pair of chambers flanking said body in a fully inserted position thereof in said slot, said body being provided with symmetrical ramps on opposite edges thereof and with a cutout intermediate said ramps defining an arcuate throttling edge;
    respective swings pivotally mounted in said chambers for swinging movement about respective axes parallel to the axis of said draft tube and perpendicular to the direction of displacement of said body, said swings being formed at free ends thereof with respective masks conforming to the contours of said draft tube and defining a smooth annular contour with said wall of said draft tube, and the edge of said cutout;
    respective control rollers on said swings engageable by said ramps and displaceable by said ramps outwardly into a fully recessed position within the respective chamber upon advance of said body toward said well of said draft tube; and
    respective actuating mechanisms biasing said swings toward said body and said control rollers into engagement with said ramps.

2. The gate defined in claim 1 wherein said edge of said cutout of said body and said masks conform to circular arc segments of a circle having a diameter equal to the diameter of said draft tube at the region thereof at which said gate is installed.

3. The gate defined in claim 2 wherein said edge of said cutout is fitted to the edges of said ramps.

4. The gate defined in claim 2 wherein said edge of said cutout is contoured to lie flush with the section of the draft tube at the place of installation of said gate.

5. The gate defined in claim 2 wherein said edge of said cutout is inclined to the section of the draft tube at the place of installation of said gate therein.

* * * * *